United States Patent [19]
Kirch

[11] Patent Number: 5,873,228
[45] Date of Patent: Feb. 23, 1999

[54] SHREDDER FOR PLANTS

[75] Inventor: Michel Kirch, Keskastel, France

[73] Assignee: Kuhn S.A., Saverne Cedex, France

[21] Appl. No.: 840,449

[22] Filed: Apr. 18, 1997

[30] Foreign Application Priority Data

May 9, 1996 [FR] France ................................. 96 05947

[51] Int. Cl.⁶ .................................................. A01D 34/24
[52] U.S. Cl. ............................................. 56/15.1; 56/15.2
[58] Field of Search ................................... 56/15.1, 15.2, 56/15.6, 15.7, 320.1, DIG. 6, DIG. 14

[56] References Cited

U.S. PATENT DOCUMENTS

| 2,645,890 | 7/1953 | Spedding | 56/15.1 |
|---|---|---|---|
| 2,679,131 | 5/1954 | Martinson | 56/15.1 |
| 4,518,046 | 5/1985 | Rettig et al. | 172/311 |
| 4,916,889 | 4/1990 | Molstad | 56/15.6 |
| 5,209,049 | 5/1993 | Heard | 56/15.5 |
| 5,528,886 | 6/1996 | Esau | 56/15.6 |
| 5,566,535 | 10/1996 | Pruitt | 56/15.1 |
| 5,765,348 | 6/1998 | Thagard et al. | 56/15.2 |

FOREIGN PATENT DOCUMENTS

| 142221 | 7/1951 | Australia | 56/15.1 |

*Primary Examiner*—Thomas B. Will
*Assistant Examiner*—Arpad Fabian Kovacs
*Attorney, Agent, or Firm*—Oblon, Spivak, McClelland, Maier & Neustadt, P.C.

[57] ABSTRACT

The present invention relates to a shredder for plants especially including a hitching device and a casing which is open downward and which is fitted with lateral skids. This casing has at least one gearbox with a substantially vertical shaft which can be driven in rotation and which carries one or more knives at its lower end. The invention is noteworthy in that the casing is connected to the hitching device by rods which are articulated to the casing and to the hitching device by axes and in that structure which allow the casing to pivot and to move with respect to the hitching device in directions transverse to the direction of forward travel are arranged between the rods and the hitching device and/or the casing.

10 Claims, 2 Drawing Sheets

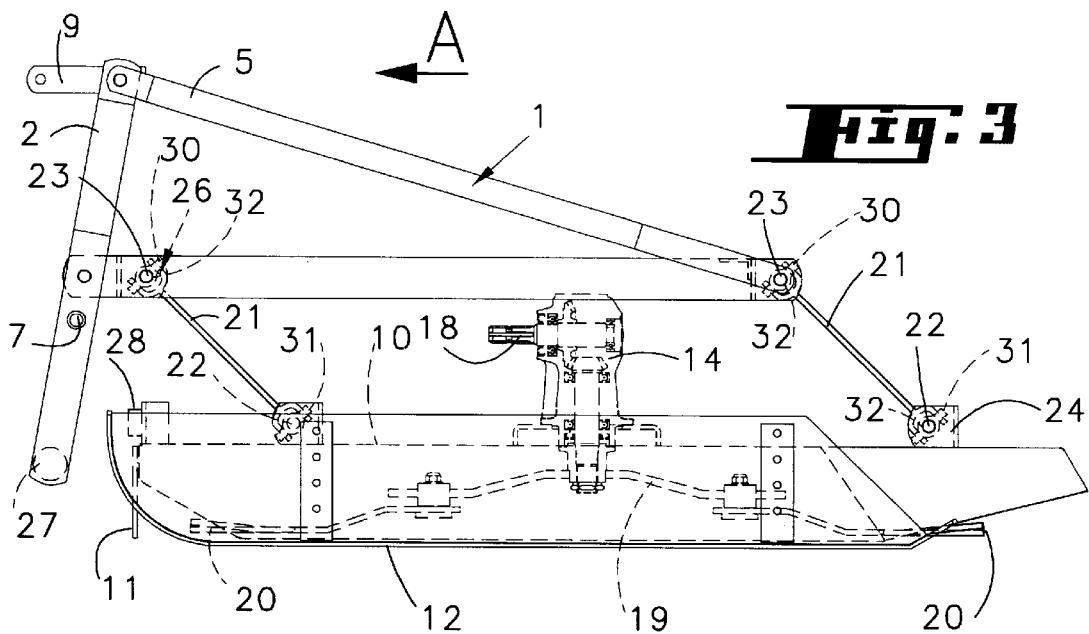
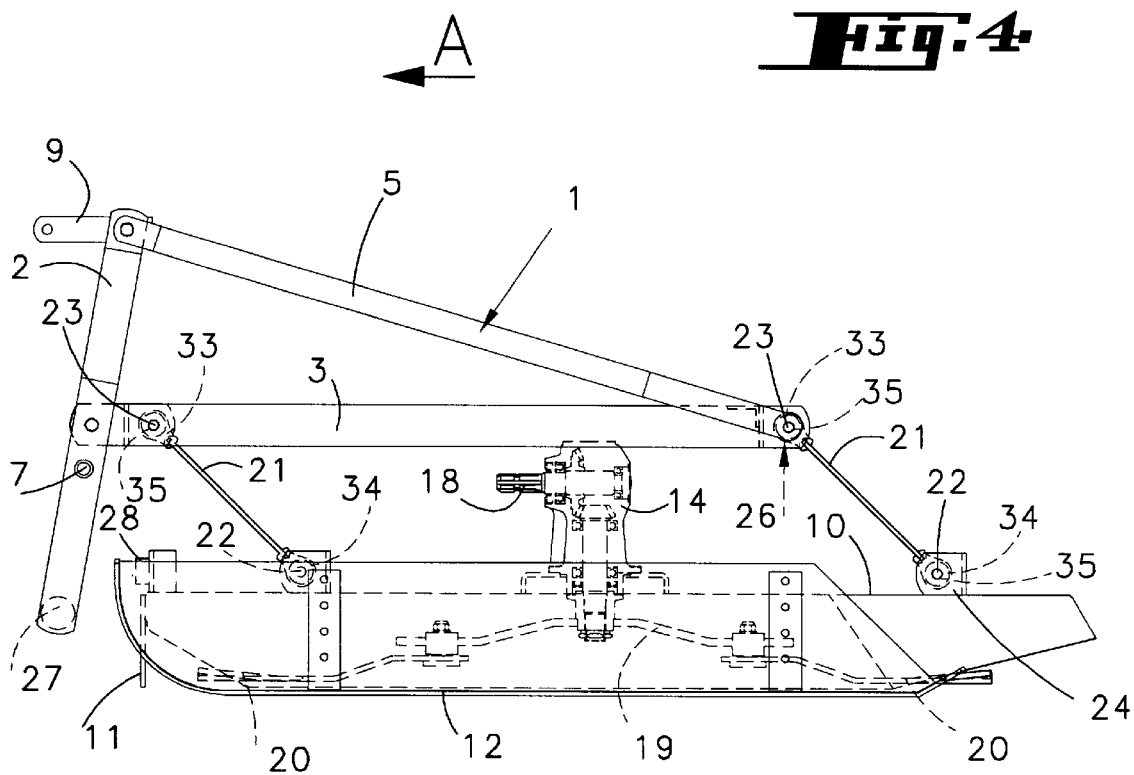

SHREDDER FOR PLANTS

BACKGROUND OF THE INVENTION

Field of the Invention

The present invention relates to a shredder for plants especially including a hitching device for the coupling to a tractor and a casing which is open downward and which is fitted with lateral skids allowing it to move along the ground, which casing has at least one gearbox with a substantially vertical shaft which can be driven in rotation and which at its lower end situated inside said casing carries one or more knives traveling in a substantially horizontal plane close to the ground.

Discussion of the Background

In a known shredder, the hitching device consists of two lugs which are fixed to the casing and of a yoke in the shape of an inverted V which is articulated to said lugs. The latter are fitted with pins for hitching it to the lower connecting arms of a tractor. The yoke has a fork for hitching it to the upper connecting arm of the tractor. This yoke is additionally connected to the rear part of the casing by means of chains.

During work, this shredder is moved by means of the tractor along the ground with the plants. The skids of the casing with the knife or knives then slide over the ground. When they travel over unevennesses in the land, the casing has to move the entire hitching device and the connecting arms of the tractor. Therefore the machine does not immediately follow the unevennesses, which leads to an irregular cut. In addition, when the casing is badly positioned the knife or knives may cut into the ground. This damages the land and increases the machine maintenance costs.

SUMMARY OF THE INVENTION

The object of the present invention is to overcome these drawbacks. The invention especially has to make the casing with the knife or knives follow the relief of the ground better.

Thus an important feature of the invention consists in the fact that the casing is connected to the hitching device by rods which are articulated both to said casing and to said hitching device by pins which are substantially horizontal and substantially perpendicular to the direction of forward travel and that means which allow the casing to pivot and to move with respect to the hitching device in directions transverse to the direction of forward travel are arranged between these rods and the hitching device and/or the casing.

These features allow the casing with the knife or knives to move both heightwise and laterally with respect to the hitching device. It can follow unevennesses of the ground independently of said hitching device and of the connecting arms of the tractor. The skids of the casing can thus follow the relief of the ground very closely. This makes it possible to obtain a relatively constant cutting height with respect to the ground and the risk of the knife or knives cutting into the ground is considerably diminished.

The invention also relates to the following features taken separately or in any technically possible combinations. The shredder includes several rods, some of which are arranged in front of the gearbox and of the shaft which carries the knife or knives and some of which are arranged behind said gearbox and said shaft. The distances between said gearbox and the axes of articulation to the casing of the rods situated in front of this gearbox, on the one hand, and of those situated behind this gearbox, on the other hand, are substantially equal. These features make it possible to have a relatively stable positioning of the casing with respect to the hitching device.

The rods which connect the casing to the hitching device are substantially mutually parallel and have substantially the same length. The assembly thus forms a deformable parallelogram. In the normal work position, the rods point obliquely downward and backward from the hitching device. The casing thus has the possibility of moving, by means of these rods, in the heightwise direction following movements in or against the direction of forward travel of the shredder, in order to follow the unevennesses of the ground. The hitching device includes a stop which interacts with buffers on the casing in order to immobilize the latter during transport.

The axes articulating the rods to the casing and to the hitching device pass through oblong orifices. These orifices may be provided at the ends of the rods. Thanks to this arrangement the casing can move heightwise with respect to each of the rods. Likewise, each of these can move heightwise and laterally with respect to the hitching device. These possibilities of movement allow the casing to pivot and to move with respect to the hitching device in directions which are transverse to the direction of forward travel so as to closely follow the unevennesses of the ground.

According to another feature of the invention, the axes providing articulation between the rods and the hitching device and between said rods and the casing each include a second axis which points in the direction of forward travel. These second axes also allow the casing to pivot with respect to the hitching device in directions transverse to the direction of forward travel in order to closely follow the unevennesses of the ground.

According to another feature of the invention, the rods which connect the casing to the hitching device have at each of their ends a ball joint with an orifice for fixing to the corresponding axis providing articulation to the casing or to the hitching device.

BRIEF DESCRIPTION OF THE DRAWINGS

Other features and advantages of the invention will emerge from the description hereafter of nonlimiting embodiments of the invention, in conjunction with the attached drawings, in which:

FIG. 3 represents a side view of another embodiment.

FIG. 4 represents a side view of a third embodiment.

DESCRIPTION OF THE PREFERRED EMBODIMENT

Figure 1:
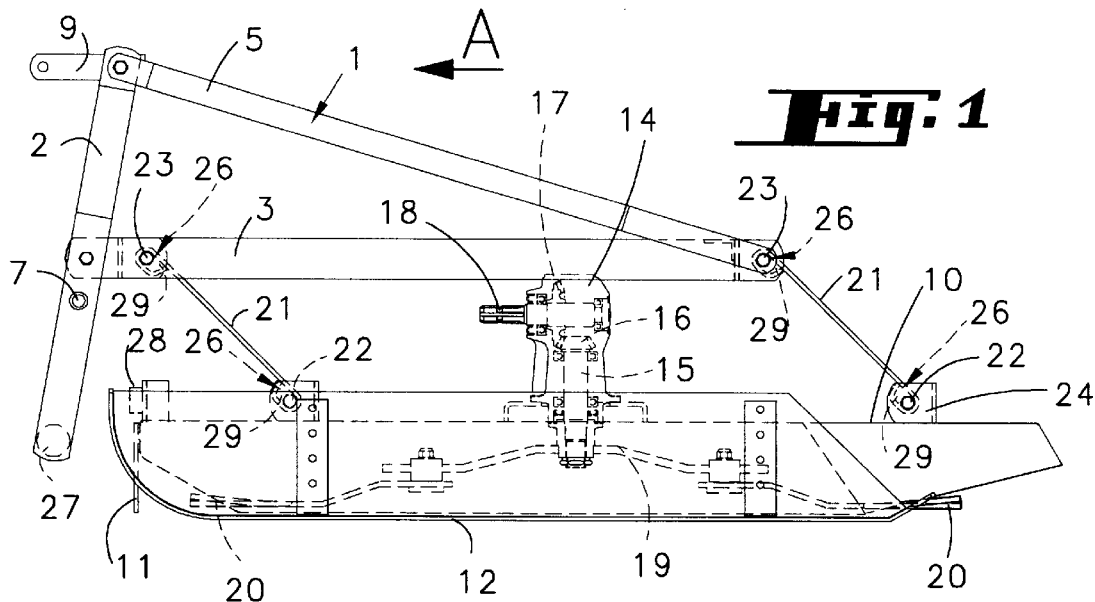
FIG. 1 represents a side view of an embodiment of a shredder according to the invention.
Figure 2:
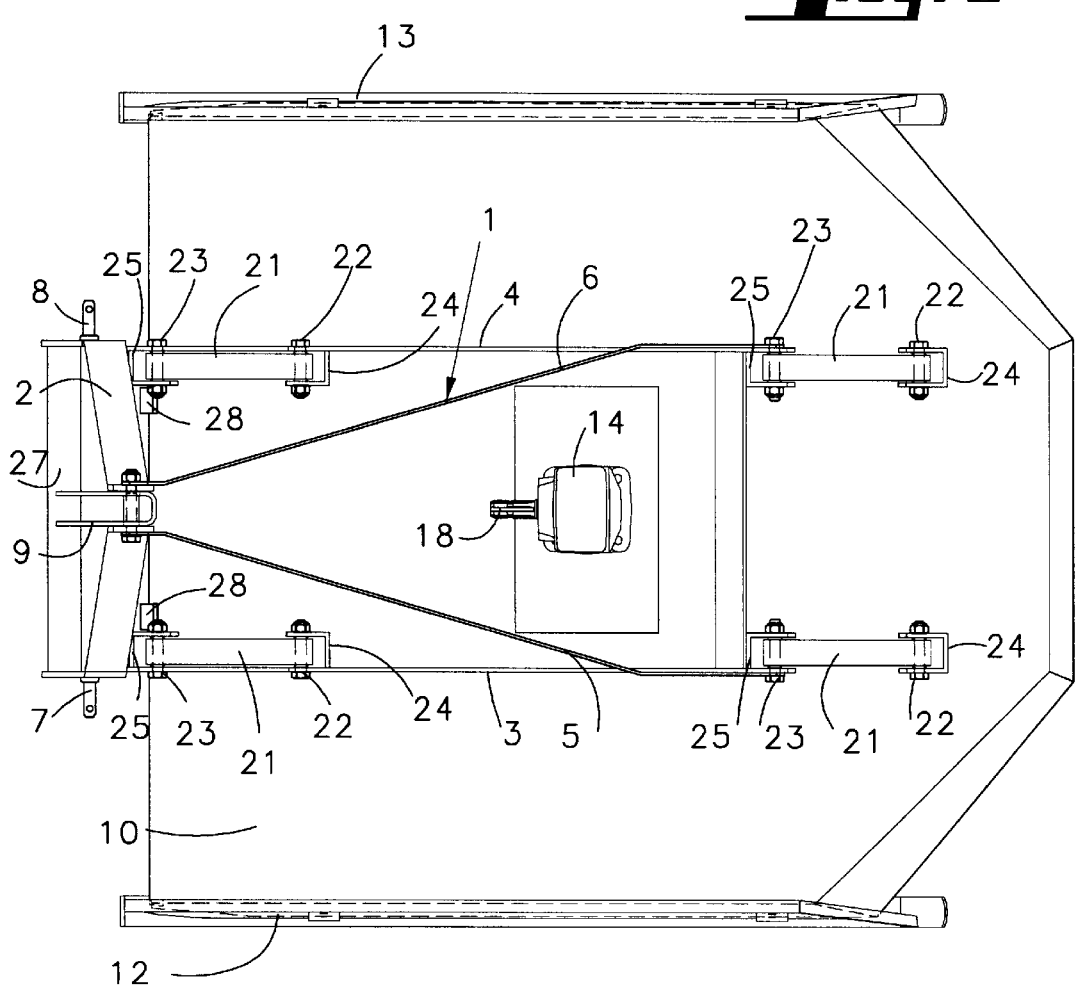
FIG. 2 represents a top view of the embodiment of FIG. 1.

As is clear from FIGS. 1 and 2, the shredder according to the invention includes a hitching device 1 for coupling it to the back or to the front of a tractor which serves to power it and to move it in the direction A. This device 1 is composed of a yoke 2, of two longitudinal beams 3 and 4 which are fixed to the yoke 2 and of two tie-rods 5 and 6 which are fixed both to the yoke 2 and to the longitudinal beams 3 and 4. Said yoke 2 has two pins 7 and 8 for hitching to the lower connecting arms and a fork 9 for hitching to the upper connecting arm of the three-point hitch of a tractor.

The shredder also has a casing 10 which is open downward. This casing 10 may also be open at the front or have a flexible front wall 11 which allows the passage of the plants. On each side it has a lateral skid 12 and 13 allowing it to move along the ground. The front end of each skid 12, 13 is rounded. The casing 10 also carries a transmission gearbox 14 approximately at its middle. This gearbox has a substantially vertical shaft 15 with a bevel gear 16 which meshes with a second bevel gear 17 fixed on a second, substantially horizontal, shaft 18. This second shaft 18 extends above the casing 10 and may be connected to the tractor power take-off by means of an intermediate transmission shaft. The lower end of the shaft 15 is located inside the casing 10. It carries a support 19 fitted with two knives 20 which extend horizontally in a plane which is close to the ground. At the front of the casing 10 these knives 20 are set back slightly from the rounded ends of the lateral skids 12 and 13.

The casing 10 is connected to the hitching device 1 by rods 21. These are articulated both to the casing 10 and to the hitching device 1 by axes 22 and 23 which are substantially horizontal and substantially perpendicular to the direction of forward travel A. The axes 22 are housed in forks 24 which are rigidly fastened to the casing 10. The axes 23 are held by the longitudinal beams 3 and 4 and angled pieces 25 which are rigidly fastened to said longitudinal beams 3 and 4. Arranged between the rods 21 and the hitching device 1 and/or the casing 10 are means 26 which allow the casing 10 to pivot and to move with respect to the hitching device 1 in directions transverse to the direction of forward travel A. In the example represented, there are four of these rods 21. This number could, however, be different. Two of these rods 21 are arranged at the front of the transmission gearbox 14 with the shaft 15 and two more rods 21 are arranged behind said gearbox 14. The distances from this gearbox 14 of the axes 22 articulating to the casing 10 the rods 21 which are situated in front of the gearbox 14 on the one hand, and the rods 21 which are situated behind the gearbox 14 on the other hand, are substantially equal.

It is clear from FIG. 1 that the rods 21 are substantially mutually parallel and that they have substantially the same length. In the normal work position they point obliquely downward and backward from the hitching device 1. These rods 21 thus form deformable parallelograms with the longitudinal beams 3 and 4 of the hitching device 1 and the casing 10. This arrangement allows the casing 10 to move in the heightwise direction following forward or backward movements (viewed in the direction of forward travel A) with respect to the hitching device 1. The yoke 2 of the hitching device 1 has a stop 27. The front side of the casing 10 has two buffers 28. These meet said stop 27 when the casing 10 moves forward with respect to the hitching device 1. They thus limit the travel of said casing 10.

In the embodiment according to FIGS. 1 and 2, the axes 22 and 23 articulating the rods 21 to the casing 10 and to the hitching device 1 pass through oblong orifices 29 constituting the aforementioned means 26. In the example represented, the rods 21 have an oblong orifice 29 at each end. These oblong orifices 29 allow the casing 10 to pivot and to move with respect to the hitching device 1 in directions transverse to the direction of forward travel A. It is also possible to fix the axes 22 and 23 on the rods 21 and to guide said axes 22 and 23 through oblong orifices provided respectively on the casing 10 and on the hitching device 1.

In the embodiment according to FIG. 3, the axes 22 and 23 providing articulation between the rods 21 and the hitching device 1 and between said rods 21 and the casing 10 each have a second axis 30, 31 which points more or less in the direction of forward travel A. These second axes 30, 31 constitute the aforementioned means 26. They can turn on the first axes 22 and 23. Each has a central orifice 32 for mounting it on the corresponding first axis 22, 23. The casing 10 can thus pivot in or against the direction of forward travel A about the first axes 22 and 23. It can also pivot in directions transverse to the direction of forward travel A about the second axes 30 and 31.

In the embodiment according to FIG. 4, the rods 21 have a ball joint 33, 34 at each of their ends. Each ball joint 33, 34 has an orifice 35 for mounting it on one of the axes 22, 23. These ball joints 33 and 34 and the rods 21 allow the casing 10 to move in and against the direction of forward travel A as well as in directions transverse to the direction of forward travel A.

During shredding work, the shredder according to the invention is hitched to a tractor which allows it to be moved in the direction A. The second shaft 18 of the transmission gearbox 14 is then connected to the tractor power take-off shaft, which allows the substantially vertical shaft 15 to be driven in rotation to make the knives 20 turn in the substantially horizontal plane and finely chop all the plants. Thanks to the arrangement of the rods 21 with respect to the gearbox 14, the casing 10 is very stable during work.

During movements by means of the tractor the lateral skids 12 and 13 slide along the ground. The hitching device 1 is positioned in such a way that the rods 21 are inclined backward and downward. In the normal work position they form angles of approximately 45° to the upper wall of the casing 10. This casing 10 can thus move heightwise with the rods 21 with respect to the hitching device 1 in order to follow the unevennesses of the ground. These movements may be done in the forward direction until the buffers 28 meet the stop 27 and in the backward direction until the rods 21 near the horizontal position. Furthermore, the casing 10 can pivot and move in directions transverse to the direction of forward travel A. These movements are made possible by the fact that the axes of articulation 22 rigidly fastened to the casing 10 can move in the oblong orifices 29 of the rods 21 and by the fact that these rods 21 can themselves move, thanks to their second oblong orifices 29, with respect to the axes of articulation 23 on the hitching device 1. This arrangement allows the casing 10 to incline easily to the right or to the left depending on the unevennesses encountered by the lateral skids 12 and 13. The knives 20 therefore always remain close to the ground without, however, cutting into said ground.

In the embodiment according to FIG. 3, the lateral inclinations of the casing 10 are achieved by pivoting about the second axes 30 and 31. The ball joints 33 and 34 of the example according to FIG. 4 also allow the casing 10 to incline laterally during work.

For transport, the rotation of the knives 20 is stopped and the shredder is raised using the tractor hitching device. The casing 10 then comes up against the stop 27 which immobilizes it.

It is quite clear that the invention is not limited to the embodiments described and represented in the appended drawings. Modifications are possible especially as regards the construction of the various elements or by substituting technical equivalents without in any way departing from the field of protection.

What is claimed as new and desired to be secured by Letters Patent of The United States is:

1. A shredder for plants especially including:

a hitching device for coupling it to a tractor, a casing which is open downward and which is fitted with lateral skids allowing it to move along the ground, at least one gearbox which is mounted on the casing and which has a substantially vertical shaft which can be driven in rotation and, one or more knives which are connected to the lower end of said shaft, which end is situated in said casing, said knives traveling in a substantially horizontal plane close to the ground, wherein the casing is connected to the hitching device by rods which are articulated both to said casing and to said hitching device by axes which are substantially horizontal and substantially perpendicular to the direction of forward travel and wherein means which allow the casing to pivot and to move with respect to the hitching device in directions transverse to the direction of forward travel are arranged between the rods and the hitching device and/or the casing.

2. A shredder as claimed in claim 1, which includes several rods, some of which are arranged in front of the gearbox and of the shaft and some of which are arranged behind these.

3. A shredder as claimed in claim 2, wherein the distances from the gearbox of the axes articulating to the casing the rods situated in front of the gearbox and the rods situated behind said gearbox are substantially equal.

4. A shredder as claimed in claim 3, wherein the rods are substantially mutually parallel and have substantially the same length.

5. A shredder as claimed in claim 4, wherein, in the normal work position, the rods point obliquely downward and backward from the hitching device.

6. A shredder as claimed in claim 1, wherein the hitching device includes a stop which interacts with buffers on the casing in order to immobilize the latter during transport.

7. A shredder as claimed in claim 1, wherein the axes articulating the rods to the casing and to the hitching device pass through oblong orifices.

8. A shredder as claimed in claim 7, wherein the rods at their two ends have oblong orifices through which the axes of articulation rigidly fastened to the hitching device and the axes of articulation rigidly fastened to the casing pass.

9. A shredder as claimed in claim 1, wherein the axes providing articulation between the rods and the hitching device and between said rods and the casing each include a second axis which points in the direction of forward travel.

10. A shredder as claimed in claim 1, wherein the rods have a ball joint at each of their ends.

* * * * *